UNITED STATES PATENT OFFICE.

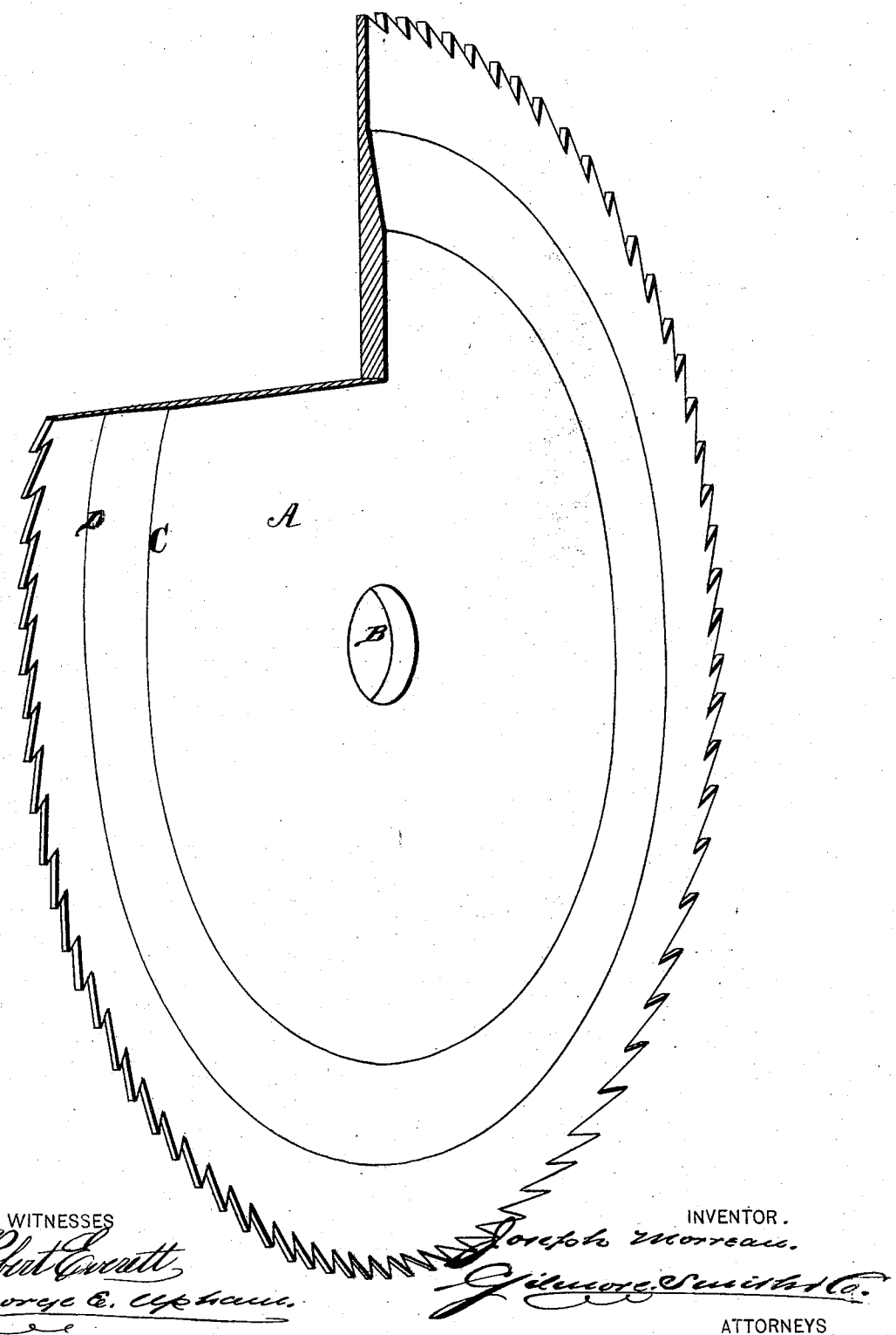

JOSEPH MORREAU, OF ALPENA, MICHIGAN.

IMPROVEMENT IN SHINGLE-SAWS.

Specification forming part of Letters Patent No. 198,142, dated December 11, 1877; application filed October 6, 1877.

*To all whom it may concern:*

Be it known that I, JOSEPH MORREAU, of Alpena, in the county of Alpena and State of Michigan, have invented a new and valuable Improvement in Shingle-Saws; and I do hereby declare that the following is a full, clear, and exact description of the construction and operation of the same, reference being had to the annexed drawing, making a part of this specification, and to the letters and figures of reference marked thereon.

Figure 1 of the drawing is a plan view, part sectional, of my shingle-saw.

The nature of my invention consists in the improved construction of a circular saw for sawing shingles, as will be hereinafter more fully set forth, and pointed out in the claim.

The annexed drawing, to which reference is made, fully illustrates my invention.

A represents the saw-plate, of the same thickness as the ordinary saws now in use—say about gage 8—from the center of the eye B to a circle, C, drawn from the center of the eye, with a radius of about twelve inches. From the circle C the plate tapers to a circle, D, concentric therewith, about three inches, more or less, in width, down to gage 14 or 15, as may be desired. From the circle D to the edge of the teeth the plate is of uniform thickness, carrying gage 14 or 15, at the option of the user. The cutting portion, from D outward, can be run with either of these two gages, and cut the same thickness as long as the saw lasts.

The saws now ordinarily in use are run with gage 15 when new, down to gage 12 when used up, thereby wasting at least from ten to fifteen per cent.

In setting my saw the set will not have to be altered, as in the ordinary saws, for after the first filing of a new saw the saw-set is good without being altered as long as the saw lasts. They will save timber and will be stiffer than the ordinary saw, and will not "wabble" or "run" in frozen timber, nor in rough or twisted timber, and they will stand more feeding than those now in use.

The tapered part C D may be made from three to four and a half inches in width, as in winter-time a shorter taper is desirable, to add more stiffness, on account of frozen timber.

What I claim as new, and desire to secure by Letters Patent, is—

The improved circular saw herein described, for sawing shingles, formed of a single piece, of uniform thickness from the eye to the circle C, then tapering gradually from C to D, and of uniform thickness from D to the edge of the teeth, substantially as shown and set forth.

In testimony that I claim the above I have hereunto subscribed my name in the presence of two witnesses.

JOSEPH MORREAU.

Witnesses:
JOSEPH DECENT,
CHARLES A. JEYTE.